United States Patent [19]

Arakawa et al.

[11] Patent Number: 4,835,397

[45] Date of Patent: May 30, 1989

[54] RADIATION IMAGE STORAGE PANEL

[75] Inventors: Satoshi Arakawa; Masamitu Nonomura, both of Minami-ashigara, Japan

[73] Assignee: Fuji Photo Film Co., Ltd., Kanagawa, Japan

[21] Appl. No.: 39,960

[22] Filed: Apr. 20, 1987

[30] Foreign Application Priority Data

Apr. 19, 1986 [JP] Japan .................................. 61-90620

Mar. 28, 1987 [JP] Japan .................................. 62-74885

[51] Int. Cl.[4] ............................................ G01M 23/04

[52] U.S. Cl. .................................................. 250/484.1

[58] Field of Search ........................... 250/484.1, 327.2

[56] References Cited

U.S. PATENT DOCUMENTS 4,654,534 3/1987 Ochiai .............................. 250/484.1

*Primary Examiner*—Carolyn E. Fields

*Attorney, Agent, or Firm*—Gerald J. Ferguson, Jr.

[57] ABSTRACT

A radiation image storage panel comprising a support and a phosphor layer provided on the support which comprises a binder and a stimulable phosphor dispersed therein, characterized in that the support part shows a deflection at a level ranging from 10 to 25 mm and the panel surface-side part containing said phosphor layer shows a deflection at a level ranging from 115 to 150 mm, said deflection being defined by a vertical distance from an imaginary plane horizontally extended from a flat board to an end of an object in the form of a sheet when the object is placed on the board, the end of which is overhung by 150 mm from the board.

8 Claims, 1 Drawing Sheet

RADIATION IMAGE STORAGE PANEL

BACKGROUND OF THE INVENTION

1. Field of the Invention

The present invention relates to a radiation image storage panel comprising a support and a phosphor layer provided thereon which comprises a stimulable phosphor.

2. Description of the Prior Art

For obtaining a radiation image, there has been conventionally employed a radiography utilizing a combination of a radiographic film having an emulsion layer containing a photosensitive silver salt material and an intensifying screen. As a method replacing the conventional radiography, a radiation image recording and reproducing method utilizing a stimulable phosphor as described, for example, in U.S. Pat. No. 4,239,968, has been recently paid much attention. In the radiation image recording and reproducing method, a radiation image storage panel comprising a stimulable phosphor (i.e., a stimulable phosphor sheet) is used, and the method involves steps of causing the stimulable phosphor of the panel to absorb a radiation energy having passed through an object or having radiated from an object; sequentially exciting the stimulable phosphor with an electromagnetic wave such as visible light and infrared rays (hereinafter referred to as "stimulating rays") to release the radiation energy stored in the phosphor as light emission (stimulated emission); photoelectrically detecting the emitted light to obtain electric signals; and reproducing the radiation image of the object as visible image from the electric signals.

In the radiation image recording and reproducing method, a radiation image is obtainable with a sufficient amount of information by applying a radiation to an object at considerably smaller dose, as compared with the conventional radiography. Accordingly, this method is of great value especially when the method is used for medical diagnosis.

The radiation image storage panel employed in the radiation image recording and reproducing method has a basic structure comprising a support and a phosphor layer provided on one surface of the support. Further, a transparent film of a polymer material is generally provided on the free surface (surface not facing the support) of the phosphor layer to keep the phosphor layer from chemical deterioration or physical shock.

The phosphor layer comprises a binder and a stimulable phosphor dispersed therein. The stimulable phosphor emits light (gives stimulated emission) when excited with an electromagnetic wave such as visible light or infrared rays (stimulating rays) after having been exposed to a radiation such as X-rays. Accordingly, the radiation having passed through an object or having radiated from an object is absorbed by the phosphor layer of the radiation image storage panel in proportion to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photoelectrically converted to electric signals, so as to reproduce a visible image from the electric signals.

The radiation image recording and reproducing method is generally carried out using a radiation image recording and reading-out apparatus of built-in type which comprises a means (recording means) for recording a radiation image on a radiation image storage panel by exposing the panel to a radiation having image information, a means (read-out means) for reading out the radiation image by irradiating the panel with stimulating rays and photoelectrically detecting stimulated emission given by the panel, a means (erasing means) for erasing a radiation image remaining in the panel by irradiating the panel having been read out with a light for erasure, and a transfer system which connects these means for transferring the panel from one means to another means. Otherwise, the method can be also carried out using apparatus of separate type in which the recording means are separated from the read-out means and the erasing means, that is, using a radiation image recording apparatus (radiographic apparatus) and a radiation image reading-out apparatus having the erasing facility. The panel having been subjected to the erasing procedure in any of the above apparatus can be reused in the next recording, so that the panel is repeatedly used. Especially, a panel is cyclically reused in the former built-in type apparatus.

In these apparatus, the transfer system for conveying the panel to the next processing means is a complicated combination of various transfer members such as a nip roller, a transfer belt and a guide plate. During the transfer, the radiation image storage panel is repeatedly applied with mechanical shocks such as bending and collision with the members. More recently, as the apparatus is miniaturized and the transfer space is necessarily smaller, the panel tends to be transferred in the state of severely bending by the rollers, etc. When the panel is repeatedly used in such apparatus, the phosphor layer of the panel is liable to suffer from cracks, and thereby an image provided by the panel is deteriorated in the image quality.

On the other hand, the radiation image storage panel is required to have stiffness (so-called "nerve") at a certain level or above. For instance, a depot for allowing panels to temporarily stay is sometimes provided on the way of the transfer system (for example, before the read-out means) to adjust the difference of the processing time in each means. In this depot, panels are allowed to stand in the state of some inclining, so that the panel per se is necessary to have a given level of self-supporting properties.

SUMMARY OF THE INVENTION

It is an object of the present invention to provide a radiation image storage panel improved in endurance of the transfer.

The object is accomplished by a radiation image storage panel comprising a support and a phosphor layer provided on the support which comprises a binder and a stimulable phosphor dispersed therein, characterized in that the support part shows a deflection at a level ranging from 10 to 25 mm and the panel surface-side part containing said phosphor layer shows a deflection at a level ranging from 115 to 150 mm, said deflection being defined by a vertical distance from an imaginary plane horizontally extended from a flat board to an end of an object in the form of a sheet when the object is placed on the board, the end of which is overhung by 150 mm from the board.

In the present invention, the panel surface means a surface of the phosphor layer or a surface of a protective film in the case that the protective film is provided on the phosphor layer.

The present inventors have studied on the endurance of a radiation image storage panel in the repeated transferring, and found that the endurance of the panel can be remarkably improved by making each of a support part (for instance, which equals to a support in the case of a panel consisting of a support, a phosphor layer and a protective film) and a panel surface-side part containing a phosphor layer (which equals to a phosphor layer and a protective film in the above case) to have a stiffness (deflection in bending) in the specific range, whereby making the resulting panel as a whole to keep a stiffness higher than a certain level.

In a conventional radiation image storage panel, a phosphor layer contains stimulable phosphor particles in an extremely larger amount than a binder and is considerably thick from the viewpoint of sensitivity, so that the phosphor layer is relatively rigid and contributes to the stiffness of the whole panel. However, cracks are apt to easily take place in the phosphor layer in the repeated use of the panel. For example, in a commercially available radiation image storage panel, the support shows the deflection at a level of approx. 30 mm, the panel surface-side part containing the phosphor layer shows the deflection at a level of approx. 100 mm, and the stiffness of the whole panel (deflection level: approx. 20 mm) is partially supplied by that of the phosphor layer.

In the radiation image storage panel according to the invention, the deflection of the panel surface-side part containing the phosphor layer is increased to a level in the range of 115 to 150 mm by appropriately adjusting the thickness of the phosphor layer, nature of the binder, a ratio between the phosphor and the binder, etc., whereby the phosphor layer becomes more flexible than the conventional one. Further, the deflection of the support part is restrained at a level in the range of 10 to 25 mm by using a rigid material as the support or by making the thickness of the support larger than that of the conventional one, and hence the support part has a relatively higher stiffness. As a result, the whole of the panel is allowed to keep a deflection higher than a certain level. That is, the phosphor has a more flexibility and the stiffness required for the whole panel is compensated by the stiffness of the support to favorably control the stiffness of each part of the panel and of the whole panel. Accordingly, occurrence of cracks in the phosphor layer can be effectively prevented and at the same time, the self-supporting properties of the panel can be maintained.

The radiation image storage panel of the invention has almost the same level of stiffness (nerve) as the conventional one and further has flexibility which is hardly obtained therein. In this reason, the panel of the invention can endure the severe bending given by rollers, etc. in the transfer system and the occurrence of cracks in the phosphor layer can be effectively prevented. Further, since the whole panel has a moderate stiffness, troubles in the transfer can be avoided in the apparatus. Therefore, the panel has high endurance (mechanical strength and flexibility) in the repeated transfer for a long period of time.

Furthermore, owing to the improvement of the transfer endurance, cracks causing deterioration in the image quality are hardly brought about in the phosphor layer for a long period, so that the radiation image storage panel of the invention can be used in the good and stable state and the quality of an image provided thereby can be kept at a high level for a long period of time.

DETAILED DESCRIPTION OF THE INVENTION

Figure 1:
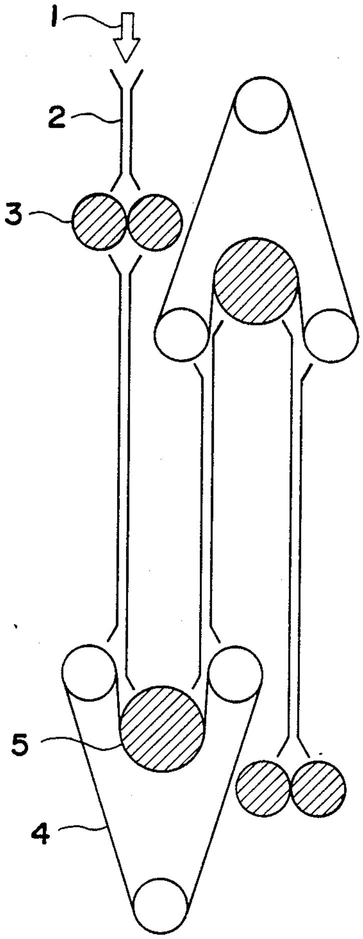
FIG. 1 is a plan view schematically illustrating a device for a transfer test of a radiation image storage panel.

In the present invention, "deflection (in bending)" for evaluating a stiffness is defined by a vertical distance (mm) from an imaginary plane horizontally extended from a flat board to an end of an object in the form of a sheet when the object is placed on the board, the end of which is overhung by 150 mm from the board. The deflection of the support part means a deflection of only the support when the panel consists of the support and the phosphor layer, or means that of a part comprising a support and a light-shielding layer when said layer is provided on at least one surface of the support, or means that of a part comprising the support and other layers such a subbing layer, a light-reflecting layer and a light-absorbing layer when these layers are provided between the support and a phosphor layer. The deflection of the panel surface-side part containing a phosphor layer means a deflection of only the phosphor layer when the panel consists of the support and the phosphor layer, or means that of a part comprising the phosphor layer and other layers such as an adhesive layer and a protective film when these layers are provided on the surface of the phosphor layer not facing the support.

The radiation image storage panel of the present invention having the above-described favorable features can be prepared, for instance, in the following manner.

The support part (support or a part containing the support) in the panel of the invention is required to show the above-mentioned deflection in bending at a level in the range of 10 to 25 mm.

The support material employed in the invention can be selected from those employed in the conventional radiographic intensifying screens or those employed in the known radiation image storage panels. Examples of the support material include plastic sheets such as sheets of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic sheet is preferably employed as the support material of the invention, and particularly preferred is a polyethylene terephthalate sheet. The plastic sheet may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

In the present invention, from the viewpoint of the enhancement of stiffness of support, it is preferred that the plastic sheet does not contain the materials such as carbon black and titanium dioxide. As for the plastic sheet such as polyethylene terephthalate sheet, a transparent or nearly transparent one which does not contain said materials generally has a higher physical strength than that containing them and is ready to prepare a thick sheet.

The thickness of the support is generally in the range of 100 μm to 1 mm. In the invention, the thickness of the support is preferably in the range of 280 to 500 μm, more preferably in the range of 300 to 350 μm.

When the support is transparent or nearly transparent as described above, a light-shielding layer comprising a light-shielding material may be provided on the surface of the support facing the phosphor layer and/or on the opposite surface thereof for protecting information recorded on the phosphor layer from being erased by light entering from the support side of the panel.

The light-shielding layer can be formed on the support, for example, by preparing a coating dispersion comprising a light-shielding material such as carbon black and a binder dissolved (dispersed) in an appropriate solvent, applying the coating dispersion onto the surface of the support and drying a layer of the coating dispersion. The binder and the solvent can be selected from those employable for the preparation of a phosphor layer, which will be described hereinafter. The thickness of the light-shielding layer is generally in the range of 2 to 30 μm.

In general, a back surface of a radiation image storage panel (support side-surface of a panel) is attached with a bar code label having information such as manufacturing number and type of the panel, while a cassette for encasing the panel is provided with a window at the corresponding position for reading the bar code therethrough. Even when the panel is encased in the cassette, the panel is exposed to light on the support side through the window. Further, the back surface of the panel is irradiated with light in the apparatus for detecting the location of the panel or reading the bar code. In order to prevent the information recorded on the phosphor layer from being elinated by the light entering from the back surface of the panel in such cases (i.e. cases other than the detection of the aimed image information), the back surface of the panel is desired to have light-shielding properties.

Accordingly, at least one surface of the support is preferably provided with the light-shielding layer when the support is the above-mentioned transparent or translucent plastic sheet such as a polyethylene terephthalate sheet.

In the preparation of a known radiation image storage panel, one or more additional layers are occasionally provided between the support and a phosphor layer, so as to enhance the bonding between the support and the phosphor layer, or to improve the sensitivity of the panel or the quality of an image (sharpness and graininess) provided thereby. For instance, a subbing layer or an adhesive layer may be provided by coating polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided on the support.

When these additional layer are provided on the support, it is necessary that a part comprising the support and these layers has the deflection level in the above-mentioned range.

As described in U.S. patent application Ser. No. 496,278, the phosphor layer-side surface of the support (or the surface of an adhesive layer, light-reflecting layer, or light-absorbing layer in the case where such layers provided on the support) may be provided with protruded and depressed portions for enhancement of the sharpness of the image.

On the support is formed a phosphor layer.

The phosphor layer basically comprises a binder and stimulable phosphor particles dispersed therein.

When the radiation image storage panel of the invention consists essentially of a support and a phosphor layer, the deflection in bending of the phosphor layer is required to be at a level ranging from 115 to 150 mm, preferably ranging from 125 to 150 mm.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphor employable in the radiation image storage panel of the invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, BaO.$xAl_2O_3$:Eu, in which x is a number satisfying the condition of $0.8 \leqq x \leqq 10$, and $M^{III}O.xSiO_2$:A, in which $M^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,236,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leqq 0.6$ and $xy \neq 0$, and a is a number satisfying the condition of $10^{-6} \leqq a \leqq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consising of Ce and Tb, and x is a number satisfying the condition of $0 < x < 0.1$, as described in U.S. Pat. No. 4,236,078;

$(Ba_{1-x},M^{2+}{}_x)FX:yA$, in which $M^{2+}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in U.S. Pat. No. 4,239,968;

$M^{II}FX.xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5\times10^{-5}\leqq x\leqq0.5$ and $0<y\leqq0.2$, respectively, as described in Japanese Patent Provisional Publication No. 55(1980)-160078;

$(Ba_{1-x},M^{II}_{x})F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5\leqq a\leqq1.25$, $0\leqq x\leqq1$, $10^{-6}\leqq y\leqq2\times10^{-1}$, and $0<z\leqq10^{-2}$, respectively, as described in Japanese Patent Provisional Publication No. 56(1981)-116777;

$(Ba_{1-x},M^{II}_{x})F_2.aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5\leqq a\leqq1.25$, $0\leqq x\leqq1$, $10^{-6}\leqq y\leqq2\times10^{-1}$, and $0<z\leqq2\times10^{-1}$, respectively, as described in Japanese Patent Provisional Publication No. 57(1982)-23673;

$(Ba_{1-x},M^{II}_{x})F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5\leqq a\leqq1.25$, $0\leqq x\leqq1$, $10^{-6}\leqq y\leqq2\times10^{-1}$, and $0<z\leqq5\times10^{-1}$, respectively, as described in Japanese Patent Provisional Publication No. 57(1982)-23675;

$M^{III}OX:xCe$, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0<x<0.1$, as described in Japanese Patent Provisional Publication No. 58(1983)-69281;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2}\leqq x\leqq0.5$ and $0<y\leqq0.1$, respectively, as described in U.S. patent application Ser. No. 497,805;

$BaFX.xA:yEu^{2+}$, in which X is at least one halogen selected from the group consisting of Cl, Br and I; A is at least one fired product of a tetrafluoroboric acid compound; and x and y are numbers satisfying the conditions of $10^{-6}\leqq x\leqq0.1$ and $0<y\leqq0.1$, respectively, as described in U.S. patent application Ser. No. 520,215;

$BaFX.xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6}\leqq x\leqq0.1$ and $0<y\leqq0.1$, respectively, as described in U.S. patent application Ser. No. 502,648;

$BaFX.xNaX':aEu^{2+}$, in which each of X and X' is at least one halogen selected from the group consisting of Cl, Br and I; and x and a are numbers satisfying the conditions of $0<x\leqq2$ and $0<a\leqq0.2$, respectively, as described in Japanese Patent Provisional Publication No. 59(1984)-56479;

$M^{II}FX.xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn Fe, Co and Ni; and x, y and z are numbers satisfying the conditions of $0<x\leqq2$, $0<y\leqq0.2$ and $0<z\leqq10^{-2}$, respectively, as described in U.S. patent application Ser. No. 535,928;

$M^{II}FX.aM^{I}X'.bM'^{II}X''_2.cM^{III}X'''_3.xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0\leqq a\leqq2$, $0\leqq b\leqq10^{-2}$, $0\leqq c\leqq10^{-2}$ and $a+b+c\geqq10^{-6}$; and x and y are numbers satisfying the conditions of $0<x\leqq0.5$ and $0<y\leqq0.2$, respectively, as described in U.S. patent application Ser. No. 543,326;

$M^{II}X_2.aM^{II}S'_2:xEu^{2+}$, in which $M^{II}$ is at least one alkaline earth metal selected from the group consisting of Ba, Sr and Ca; each of X and X' is at least one halogen selected from the group consisting of Cl, Br and I, and $X\neq X'$; and a and x are numbers satisfying the conditions of $0.1\leqq a\leqq10.0$ and $0<x\leqq0.2$, respectively, as described in U.S. patent application Ser. No. 660,987;

$M^{II}FX.aM^{I}X':xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0\leqq a\leqq4.0$ and $0<x\leqq0.2$, respectively, as described in U.S. patent application Ser. No. 668,464;

$M^{I}X:xBi$, in which $M^{I}$ is at least one alkali metal selected from the group consisting of Rb and Cs; X is at least one halogen selected from the group consisting of Cl, Br and I; and x is a number satisfying the condition of $0<x\leqq0.2$, as described in U.S. patent application Ser. No. 846,919; and alkali metal halide phosphors as described in Japanese Patent Provisional Publication No. 61(1986)-72087.

The $M^{II}X_2.aM^{II}X'_2:xEu^{2'}$ phosphor described in the above-mentioned U.S. patent application Ser. No. 660,987 may contain the following additives in the following amount per 1 mol of $M^{II}X_2.aM^{II}X'_2$:

$bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0<b=10.0$, as described in U.S. patent application Ser. No. 699,325;

$bKX''.cMgX'''_2.dM^{III}X''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0\leqq b\leqq2.0$, $0\leqq c\leqq2.0$, $0\leqq d\leqq2.0$ and $2\times10^{-5}\leqq b+c+d$, as described in U.S. patent application Ser. No. 723,819;

yB, in which y is a number satisfying the condition of $2\times10^{-4}\leqq y\leqq 2\times10^{-1}$, as described in U.S. patent application Ser. No. 727,974;

bA, in which A is at least one oxide selected from the group consisting of $SiO_2$ and $P_2O_5$; and b is a number satisfying the condition of $10^{-4}\leqq b\leqq 2\times10^{-1}$, as described in U.S. patent application Ser. No. 727,972;

bSiO, in which b is a number satisfying the condition of $0<b\leqq 3\times10^{-2}$, as described in U.S. patent application Ser. No. 797,971;

$bSnX''_2$, in which X'' is at least one halogen selected from the group consisting of F, Cl, Br and I; and b is a number satisfying the condition of $0<b\leqq 10^{-3}$, as described in U.S. patent application Ser. No. 797,971;

$bCsX''.cSnX'''_2$, in which each of X'' and X''' is at least one halogen selected from the group consisting of F, Cl, Br and I; and b and c are numbers satisfying the conditions of $0<b\leqq 10.0$ and $10^{\leqq 6}\leqq c\leqq 2\times10^{-2}$, respectively, as described in U.S. patent application Ser. No. 850,715; and $bCsX''.yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0<b\leqq 10.0$ and $10^{-6}\leqq y\leqq 1.8\times10^{-1}$, respectively, as described in U.S. patent application No. 850,715.

Among the above-described stimulable phosphors, the divalent europium activated alkaline earth metal halide phosphor and rare earth element activated rare earth oxyhalide phosphor are particularly preferred, because these phosphors shows stimulated emission of high luminance. The above-described stimulable phosphors are given by no means to restrict the stimulable phosphor employable in the present invention. Any other phosphors can be also employed, provided that the phosphor gives stimulated emission when excited with stimulating rays after exposure to a radiation.

Examples of the binder for the phosphor layer include: natural polymers such as proteins (e.g. gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol and linear polyester. Particularly preferred are linear polyester, polyalkyl (meth)acrylate, a mixture of nitrocellulose and linear polyester, and a mixture of nitrocellulose and polyalkyl (meth)acrylate. These binders may be crosslinked with a crosslinking agent.

The phosphor layer can be formed on the support, for instance, by the following procedure.

In the first place, stimulable phosphor particles and a binder are added to an appropriate solvent, and then they are mixed to prepare a coating dispersion comprising the phosphor particles homogeneously dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the stimulable phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40. In the invention, the ratio therebetween is particularly preferably within the range of from 1:8 to 1:30.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly onto the surface of the support to form a layer of the coating dispersion. The coating procedure can be carried out by a conventional method such as a method using a doctor blade, a roll coater or a knife coater.

After applying the coating dispersion onto the support, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 μm to 1 μm, and preferably from 50 to 500 μm. In the invention, the thickness thereof is particularly preferably within the range of from 100 to 400 μm.

The phosphor layer can be provided onto the support by the methods other than that given in the above. For instance, the phosphor layer is initially prepared on a sheet (false support) such as a glass plate, metal plate or plastic sheet using the aforementioned coating dispersion and then thus prepared phosphor layer is superposed on the genuine support by pressing or using and adhesive agent.

The deflection level of the phosphor layer can be set in the aforementioned range (115–150 mm) by suitably adjusting at least one of the ratio between the phosphor and the binder, the thickness of the phosphor layer and the kind of the binder. In concrete, to increase the deflection of the phosphor layer and to make the phosphor layer more flexible than the conventional one, the ratio therebetween is reduced, the thickness of the phosphor layer is made smaller, or a soft material is used as the binder.

In the conventional radiation image storage panel, a transparent film is generaly provided on the surface of the phosphor layer not facing the support to protect the phosphor layer from physical and chemical deterioration. The transparent protective film may be provided in the radiation image storage panel of the invention.

When the protective film is provided on the phosphor layer, a part comprising the phosphor layer and the protective film (and a further adhesive layer in the case that the adhesive layer is provided therebetween) is required to have the deflection level in the aforementioned range (115–150 mm).

The transparent film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 3 to 20 μm.

The radiation image storage panel prepared as above preferably shows the deflection at a level ranging from 10 to 50 mm as a whole, from the viewpoint of the improvement of transfer endurance.

The radiation image storage panel of the invention may be colored with a colorant to enhance the sharpness of the resulting image as described in U.S. Pat. No. 4,394,581 and U.S. patent application Ser. No. 326,642. For the same purpose, the phosphor layer of the radiation image storage panel may contain a white powder as described in U.S. Pat. No. 4,350,893.

The present invention will be illustrated by the followed examples, but these examples by no means restrict the invention.

Example 1

To a mixture of a divalent europium activated barium fluorobromide stimulable phosphor particles ($BaFBr:Eu^{2+}$) and a polyalkyl (meth)acrylate resin (trade name: Dinal DR-107, available from Mitsubishi Rayon Co., Ltd.) were added successively methyl ethyl ketone and nitrocellulose (nitration degree: 11.5%), to prepare a dispersion containing the phosphor particles and the binder (20:1, by weight). Subsequently, tricresyl phosphate and methyl ethyl ketone were added to the dispersion. The mixture was sufficiently stirred by means of a propeller agitater to prepare a homogeneous coating dispersion having a viscosity of 25–35 PS (at 25° C.).

The coating dispersion was applied to a polyethylene terephthalate sheet (support, trade name: Toray Lumirror H-type, thickness: 350 μm, available from Toray Industries, Inc.) placed horizontally on a glass plate. The application of the coating dispersion was done using a doctor blade. The support having a layer of the coating dispersion was then placed in an oven and heated at a temperature gradually rising from 25° to 100° C. Thus, a phosphor layer having a thickness of 300 μm was formed on the support.

On the phosphor layer was placed a polyethylene terephthalate transparent film (thickness: 10 μm; provided with a polyester adhesive layer on one surface) to bond the film and the phosphor layer with the adhesive layer, to form a transparent protective film thereon. Thus, a radiation image storage panel consisting essentially of a support, a phosphor layer and protective film was obtained.

Example 2

The procedure of Example 1 was repeated except for varying the thickness of the support to 300 μm, to prepare a radiation image storage panel consisting essentially of a support, a phosphor layer and a protective film.

Example 3

The procedure of Example 1 was repeated except for varying the thickness of the support to 500 μm and using as a binder a mixture of the binder of Example 1 and a polyalkyl (meth)acrylate resin (trade name: Dinal DR-50, available from Mitsubishi Rayon Co., Ltd.) which was more rigid than that of Example 1, in a mixing ratio of 1:1 by weight, to prepare a radiation image storage panel consisting essentially of a support, a phosphor layer and a protective film.

Example 4

The procedure of Example 1 was repeated except for varying the thickness of the support to 500 μm and using as a binder a polyalkyl (meth)acrylate resin (trade name: Dinal DR-102, available from Mitsubishi Rayon Co., Ltd.) which was softer than that of Example 1, to prepare a radiation image storage panel consisting essentially of a support, a phosphor layer and a protective film.

Example 5

The procedure of Example 1 was repeated except for using a support having a thickness of 280 μm (a combined polyethylene terephthalate sheet of Toray Lumirror H-type in 250 μm thick and Toray Lumirror S-type in 25 μm thick, which is both available from Toray Industries, Inc. and bonded with a polyester adhesive layer in 5 μm thick) and using the binder of Example 3, to prepare a radiation image storage panel consisting essentially of a support, a phosphor layer and protective film.

Example 6

The procedure of Example 1 was repeated except for using the support of Example 5 and using the binder of Example 4, to prepare a radiation image storage panel consisting essentially of a support, a phosphor layer and a protective film.

Example 7

The procedure of Example 1 was repeated except for providing a light-shielding layer having a thickness of approx. 10 μm on the surface of the support not facing the phosphor layer by applying a coating dispersion comprising carbon black particles dispersed in a polyester binder solution (solvent: methyl ethyl ketone) and drying a layer of the coating dispersion, to prepare a radiation image storage panel consisting essentially of a light-shielding layer, a support, a phosphor layer and a protective film.

The light-shielding layer had an optical density of approx. 5.

Comparison Example 1

A commercially available radiation image storage panel (trade name: Fuji Imaging Plate ST, available from Fuji Photo Film Co., Ltd.) comprising a support having a thickness of 250 μm and a phosphor layer having a thickness of 330 μm was used for comparison.

The radiation image storage panels obtained in Examples 1 to 7 and Comparison Example 1 were measured on the deflection with respect to the support (or a part comprising the support and the light-shielding layer), a part comprising the phosphor layer and the protective film, and the whole panel. The deflection level was determined as follows: An object in the form of a sheet (100 mm×250 mm) was placed on a flat board in such a manner that a longitudinal end of the object was overhung by 150 mm from the side end of the board, and a vertical distance from an imaginary plane horizontally extended from the board to the overhung end of the object was measured. The results are set forth in Table 1.

TABLE 1

| | Deflection | | |
|---|---|---|---|
| | Support | Phosphor Layer + Protective Film | Panel |
| Example 1 | 15 | 129 | 18 |
| Example 2 | 22 | 129 | 23 |
| Example 3 | 10 | 115 | 12 |
| Example 4 | 10 | 140 | 15 |
| Example 5 | 25 | 115 | 20 |
| Example 6 | 25 | 140 | 40 |
| Example 7 | 15 | 129 | 18 |
| Com. Example 1 | 28 | 106 | 19 |

Then, the radiation image storage panels were evaluated on the endurance in the transferring according to the following test.

Each of the panels was cut to give a test strip of 100 mm×250 mm. The test strip was transferred in a transfer testing device shown in FIG. 1.

The test strip was introduced into the device from an opening indicated by an arrow 1, and was moved between guide plates 2 and further between nip rolls 3 (each diameter: 25 mm). Subsequently, the test strip was bent to the inner side along a rubber roll 5 (diameter: 50 mm) by a transfer belt 4 and then to the outer side along another rubber roll on the way of moving. The test strip was further moved between other guide plates and between other nip rolls. The transferring operation was made repeatedly, and damages (cracks) in the phosphor layer of the test strip was measured by eye-observation.

The results are set forth in Table 2.

TABLE 2

| | Cracks (number of round-trip transfer) |
|---|---|
| Example 1 | not observed (4,000 times) |
| Example 2 | not observed (4,000 times) |
| Example 3 | not observed (3,000 times) |
| Example 4 | not observed (5,000 times) |
| Example 5 | not observed (3,000 times) |
| Example 6 | not observed (5,000 times) |
| Example 7 | not observed (4,000 times) |
| Com. Example 1 | observed (1,000 times) |

As is evident from the results set forth in Table 2, any crack did not occurred in the phosphor layer of the radiation image storage panels of the invention (Examples 1 to 7), in spite of a great number of repeated transferring. On the contrary, cracks occurred in the phosphor layer of the conventional radiation image storage panel (commercially available panel of Comparison Example 1), even when the panel was repeatedly transferred only 1,000 times.

Further, it was confirmed from the above-described transfer test that the radiation image storage panels of the invention satisfactorily had the self-supporting properties.

We claim:

1. A radiation image storage panel comprising a support, a phosphor layer provided on the support which comprises a binder and a stimulable phosphor dispersed therein and a protective layer arranged on the phosphor layer, wherein the support is a polyethylene terephthalate sheet having a thickness in the range of 280 to 500 μm and shows a deflection at a level ranging from 10 to 25 mm and the phosphor layer and the protective layer in combination shows a deflection at a level ranging from 115 to 150 mm, said deflection being defined by a vertical distance from an imaginary plane horizontally extended from a flat board to an end of an object in the form of a sheet when the object is placed on the board, the end of which is overhung by 150 mm from the board.

2. The radiation image storage panel as claimed in claim 1, in which the whole of said panel shows the deflection at a level ranging from 10 to 50 mm.

3. The radiation image storage panel as claimed in claim 1, in which the phosphor layer and the protective layer in combination shows the deflection at a level ranging from 125 to 150 mm.

4. The radiation image storage panel as claimed in claim 1, in which said support has a thickness in the range of 300 to 350 μm.

5. The radiation image storage panel as claimed in claim 1, in which said support is provided with a light-shielding layer on the surface facing the phosphor layer, on the surface opposite thereto, or both surfaces and a support part comprising the support and the light-shielding layer shows the deflection at a level ranging from 10 to 25 mm.

6. The radiation image storage panel as claimed in claim 1, in which said phosphor layer has a thickness in the range of 100 to 400 μm.

7. The radiation image storage panel as claimed in claim 1, in which a mixing ratio between the stimulable phosphor and the binder in the phosphor layer is in the range of 8:1 to 30:1.

8. The radiation image storage panel as claimed in claim 1, wherein said binder contained in the phosphor layer is linear polyester, polyalkyl (meth) acrylate, or a mixture of linear polyester and polyalkyl (meth) acrylate.

* * * * *